(12) United States Patent
Takabayashi et al.

(10) Patent No.: US 12,676,334 B2
(45) Date of Patent: Jul. 7, 2026

(54) SECONDARY BATTERY

(71) Applicant: SANYO Electric Co., Ltd., Kadoma (JP)

(72) Inventors: Hiroshi Takabayashi, Hyogo (JP); Ryuhei Kai, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 750 days.

(21) Appl. No.: 17/909,416

(22) PCT Filed: Feb. 8, 2021

(86) PCT No.: PCT/JP2021/004634
§ 371 (c)(1),
(2) Date: Sep. 5, 2022

(87) PCT Pub. No.: WO2021/176961
PCT Pub. Date: Sep. 10, 2021

(65) Prior Publication Data
US 2023/0087148 A1     Mar. 23, 2023

(30) Foreign Application Priority Data

Mar. 6, 2020     (JP) ................................. 2020-038287

(51) Int. Cl.
H01M 10/04 (2006.01)
H01M 10/0587 (2010.01)
H01M 50/46 (2021.01)

(52) U.S. Cl.
CPC ... H01M 10/0431 (2013.01); H01M 10/0587 (2013.01); H01M 50/46 (2021.01)

(58) Field of Classification Search
CPC ............. H01M 10/0431; H01M 50/46; H01M 10/0587

(Continued)

(56) References Cited

U.S. PATENT DOCUMENTS

| 2006/0154138 A1 | 7/2006 | Miyamoto et al. |
| 2006/0154140 A1 | 7/2006 | Yamamoto et al. |

(Continued)

FOREIGN PATENT DOCUMENTS

| JP | 2006-196276 A | 7/2006 |
| JP | 2012-49073 A | 3/2012 |

(Continued)

OTHER PUBLICATIONS

Office Action dated Feb. 21, 2023, issued in counterpart IN application No. 202247056415. (5 pages).

(Continued)

*Primary Examiner* — Niki Bakhtiari
*Assistant Examiner* — Omar M Kekia
(74) *Attorney, Agent, or Firm* — WHDA, LLP

(57) ABSTRACT

Wound positive-electrode core body exposed pails are bundled and connected to a positive-electrode collector body. A tape is affixed straddling a separator positioned on the outermost surface of a winding electrode body, and the outermost surface of the wound positive-electrode core body exposed parts. The tape has a porous base material and an adhesive layer provided on the base material. The tape has a region in which the adhesive layer b is not provided on the base material a between the connection part between the tape and the separator positioned on the outermost surface of the winding electrode body, and the connection part between the tape and the outermost surface of the wound positive-electrode core body exposed parts.

3 Claims, 4 Drawing Sheets

100

(58) Field of Classification Search
USPC ......................................................... 429/162
See application file for complete search history.

(56)                        References Cited

U.S. PATENT DOCUMENTS

| | | | |
|---|---|---|---|
| 2006/0251962 A1 | 11/2006 | Kim | |
| 2013/0084479 A1* | 4/2013 | Nonaka ............. | H01M 10/0431 |
| | | | 429/94 |
| 2015/0004464 A1 | 1/2015 | Okuno et al. | |
| 2015/0099189 A1* | 4/2015 | Ketzer .................... | H01M 4/14 |
| | | | 429/246 |
| 2017/0084958 A1* | 3/2017 | Ueda ..................... | H01M 50/46 |
| 2021/0313587 A1* | 10/2021 | Kwon ................. | H01M 10/058 |

FOREIGN PATENT DOCUMENTS

| | | | |
|---|---|---|---|
| JP | 2016-100270 | A | 5/2016 |
| JP | 6015676 | B2 | 10/2016 |
| KR | 10-2006-0022126 | A | 3/2006 |
| WO | 2004/038833 | A1 | 5/2004 |

OTHER PUBLICATIONS

International Search Report dated Apr. 6, 2021, issued in counterpart International Application No. PCT/JP2021/004634 (2 pages).

* cited by examiner

Figure 6
30
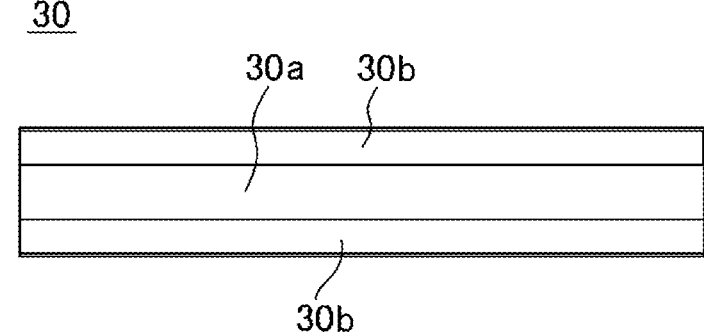
30a   30b
30b
Figure 7A
3
3b
L2
5c        3a   3b        30   4c
Figure 7B
3
3b
3a   L1
3b
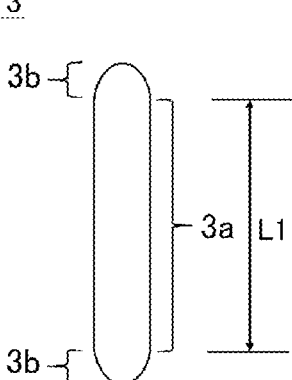

SECONDARY BATTERY

CROSS-REFERENCE TO RELATED APPLICATION

This application is a National Phase Application filed under 35 U.S.C. 8371 of International Application No. PCT/JP2021/004634 filed on Feb. 8, 2021 which claims the benefit of priority under 35 U.S.C. § 119 (a) of Japanese Patent Application No. 2020-038287 filed in Japan on Mar. 6, 2020, the contents of which are incorporated herein by reference.

TECHNICAL FIELD

The present disclosure relates to a secondary battery.

BACKGROUND ART

Secondary batteries such as an alkali secondary battery and a non-aqueous electrolyte secondary battery have been used in a driving power source for electric vehicle (EV) and hybrid electric vehicle (BEV, PHEV) or a stationary storage battery system for an application for suppressing an output variation of photovoltaic power generation, wind power generation, or the like, or for an application for a peak shift of grid power for storing power during the nighttime and utilizing the power in the daytime, for example.

In the above-described secondary battery, a foreign substance may be mixed while the secondary battery is assembled, for example. Particularly when the mixed foreign substance is a conductive foreign substance such as a metal foreign substance, an internal short circuit may occur. When the metal foreign substance adheres to a positive electrode plate, for example, the metal foreign substance is dissolved as metal ions in an electrolytic solution due to a high potential of a positive electrode plate, and is deposited as a metal when the metal ions reach a negative electrode plate. When the metal is deposited to grow toward the positive electrode plate, and the metal pierces a separator and contacts the positive electrode plate, an internal short circuit occurs. The mixed metal foreign substance may also directly pierce the separator so that an internal short circuit occurs.

Patent Literature 1 proposes a secondary battery in which an insulating member covers a positive electrode exposure part or a negative electrode exposure part, and an end portion of a separator adjacent to the outer periphery of the positive electrode exposure part or the negative electrode exposure part, for the purpose of preventing an internal short circuit from occurring due to a mixed foreign substance.

CITATION LIST

Patent Literature

PATENT LITERATURE 1: Japanese Unexamined Patent Application Publication No. 2012-49073

SUMMARY

A secondary battery according to an aspect of the present disclosure comprises a first electrode plate in which a first electrode active material layer is formed on a first electrode core, a second electrode plate in which a second electrode active material layer is formed on a second electrode core, and a flat-shaped wound electrode assembly in which the first electrode plate and the second electrode plate are wound with a separator interposed therebetween, wherein the wound electrode assembly includes a wound first electrode core exposure part at one end portion in a direction in which a winding axis of the wound electrode assembly extends, and includes a wound second electrode core exposure part at the other end portion in the direction in which the winding axis extends, the wound first electrode core exposure part is bundled and connected to a first electrode current collector, the separator is arranged on an outermost surface of the wound electrode assembly, a tape is attached to span the separator arranged on the outermost surface of the wound electrode assembly and an outermost surface of the wound first electrode core exposure part, the tape includes a porous base material and an adhesive layer provided on the base material, and the tape includes a region where the adhesive layer is not provided on the base material, between an adhesion part between the tape and the separator arranged on the outermost surface of the wound electrode assembly and an adhesion part between the tape and the outermost surface of the wound first electrode core exposure part.

A configuration of the secondary battery according to the aspect of the present disclosure makes it possible to prevent a foreign substance from entering the wound electrode assembly from a space between the separator positioned on the outermost surface of the wound electrode assembly and the wound first electrode core exposure part because the tape is attached to span the separator arranged on the outermost surface of the wound electrode assembly and the outermost surface of the wound first electrode core exposure part. The base material of the tape is porous, and the region where the adhesive layer is not provided on the base material is formed between the adhesion part between the tape and the separator arranged on the outermost surface of the wound electrode assembly and the adhesion part between the tape and the outermost surface of the wound first electrode core exposure part. Accordingly, an electrolytic solution is not prevented from entering the wound electrode assembly. Therefore, a portion where the electrolytic solution is insufficient can be prevented from occurring in the wound electrode assembly. If the portion where the electrolytic solution is insufficient occurs in the wound electrode assembly, a problem that a battery characteristic decreases or lithium deposition occurs, for example, may occur.

The porous base material is preferably a nonwoven fabric.

A basis weight of the nonwoven fabric is preferably 40 to 100 g/m², and an average fiber diameter of fibers composing the nonwoven fabric is preferably 8 to 60 μm.

The first electrode plate is preferably a positive electrode plate, and the second electrode plate is preferably a negative electrode plate.

According to the aspect of the present disclosure, a metal foreign substance is prevented from entering the wound electrode assembly without the electrolytic solution being prevented from entering the wound electrode assembly.

BRIEF DESCRIPTION OF DRAWINGS

FIG. 6 is a plan view of a tape according to the embodiment.

FIG. 7A is a plan view of a flat-shaped wound electrode assembly according to the embodiment.

FIG. 7B is a side view of the flat-shaped wound electrode assembly according to the embodiment.

DESCRIPTION OF EMBODIMENTS

A secondary battery according to an embodiment of the present disclosure will be described with reference to the drawings. The scope of the present invention is not limited to embodiments, described below, but can be arbitrarily changed within the scope of the technical idea of the present invention.

First, a configuration of a rectangular secondary battery as the secondary battery according to the embodiment will be described.

Figure 1:
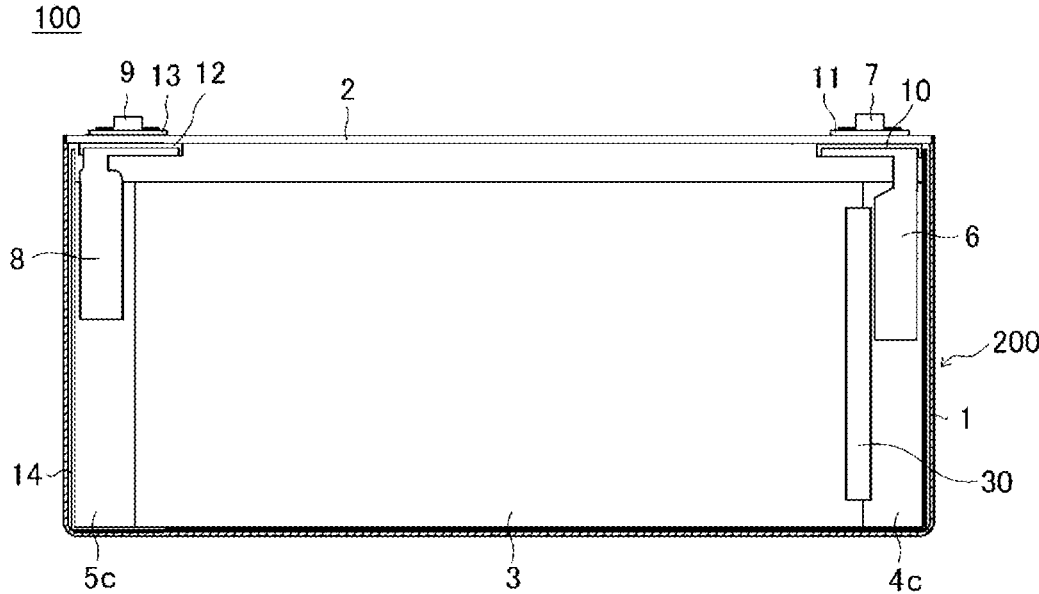
FIG. 1 is a front view illustrating a battery inner portion, excluding a front surface portion of a battery case and a front surface portion of an insulation sheet, of a secondary battery according to an embodiment.
Figure 2:
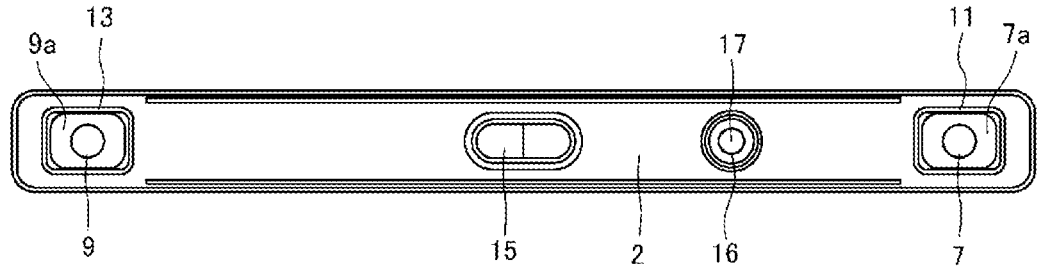
FIG. 2 is a top view of the secondary battery according to the embodiment.

As illustrated in FIG. 1 and FIG. 2, a rectangular secondary battery 100 comprises a rectangular exterior member 1 having an opening at its top and a sealing plate 2 that seals the opening. The rectangular exterior member 1 and the sealing plate 2 constitute a battery case 200. Each of the rectangular exterior member 1 and the sealing plate 2 is made of a metal, and can be made of aluminum or an aluminum alloy, for example. A flat-shaped wound electrode assembly 3 in which a strip-shaped positive electrode plate and a strip-shaped negative electrode plate are wound with a strip-shaped separator sandwiched therebetween, together with an non-aqueous electrolyte, is housed in the rectangular exterior member 1. The positive electrode plate has a positive electrode active material layer containing a positive electrode active material formed on its positive electrode core made of a metal. The positive electrode plate has a positive electrode core exposure part, to which the positive electrode core is exposed, formed in its longitudinal direction. The negative electrode plate has a negative electrode active material layer containing a negative electrode active material formed on its negative electrode core made of a metal. The negative electrode plate has a negative electrode core exposure part, to which the negative electrode core is exposed, formed in its longitudinal direction. The positive electrode core can be made of aluminum or an aluminum alloy, for example. The negative electrode core can be made of copper or a copper alloy, for example.

In the wound electrode assembly 3, a positive electrode core exposure part 4c that is a positive electrode core having no positive electrode active material layer formed thereon is arranged in a wound state on one end side in a direction in which a winding axis of the wound electrode assembly 3 extends. The positive electrode core exposure part 4c enters a laminated state by being wound with neither a separator nor a negative electrode plate interposed therebetween. A positive electrode current collector 6 is connected to the wound positive electrode core exposure part 4c. The positive electrode current collector 6 can be made of aluminum or an aluminum alloy, for example.

In the wound electrode assembly 3, a negative electrode core exposure part 5c that is a negative electrode core having no negative electrode active material layer formed thereon is arranged in a wound state on the other end side in the direction in which the winding axis of the wound electrode assembly 3 extends. The negative electrode core exposure part 5c enters a laminated state by being wound with neither a separator nor a positive electrode plate interposed therebetween. A negative electrode current collector 8 is connected to the wound negative electrode core exposure part 5c. The negative electrode current collector 8 can be made of copper or a copper alloy, for example.

A tape 30 is attached to span a separator 20 positioned on an outermost surface of the wound electrode assembly 3 and an outermost surface of the wound positive electrode core exposure part 4c.

A positive electrode terminal 7 includes a flange portion 7a arranged on the battery outer side of the sealing plate 2 and an insertion part to be inserted into a through hole provided in the sealing plate 2. The positive electrode terminal 7 is made of a metal, and can be made of aluminum or an aluminum alloy, for example. A negative electrode terminal 9 includes a flange portion 9a arranged on the battery outer side of the sealing plate 2 and an insertion part to be inserted into a through hole provided in the sealing plate 2. The negative electrode terminal 9 is made of a metal, and can be made of copper or a copper alloy, for example. The negative electrode terminal 9 may have a portion made of aluminum or an aluminum alloy and a portion made of copper or a copper alloy. In this case, the portion made of aluminum or an aluminum alloy preferably protrudes more outwardly than the sealing plate 2, and the portion made of copper or a copper alloy is preferably connected to the negative electrode current collector 8.

The positive electrode current collector 6 is fixed to the sealing plate 2 with an inner-side insulating member 10 made of resin sandwiched therebetween, and the positive electrode terminal 7 is fixed to the sealing plate 2 with an outer-side insulating member 11 made of resin sandwiched therebetween. The negative electrode current collector 8 is fixed to the sealing plate 2 with an inner-side insulating member 12 made of resin sandwiched therebetween, and the negative electrode terminal 9 is fixed to the sealing plate 2 with an outer-side insulating member 13 made of resin sandwiched therebetween.

The wound electrode assembly 3 is housed in the rectangular exterior member 1 with it being covered with an insulation sheet 14. The sealing plate 2 is welded and connected to an opening edge of the rectangular exterior member 1 by laser welding or the like. The sealing plate 2 includes an electrolytic solution injection hole 16. After injecting an electrolytic solution into the rectangular exterior member 1, the electrolytic solution injection hole 16 is sealed by a sealing plug 17. A gas exhaust vent 15 for exhausting a gas when a pressure in the battery case 200 reaches a predetermined value or more is formed in the sealing plate 2.

Details of each of components will be described below.
[Positive Electrode Plate]

First, a method of manufacturing a positive electrode plate will be described.
[Production of Positive Electrode Active Material Layer Slurry]

A lithium-nickel-cobalt-manganese composite oxide as a positive electrode active material, polyvinylidene fluoride (PVdF) as a binder, a carbon material as a conductive agent, and N-methyl-2-pyrrolidone (NMP) as a dispersion medium are kneaded such that a mass ratio of the lithium-nickel-cobalt-manganese composite oxide, the PVdF, and the carbon material is 97.5:1:1.5, to produce a positive electrode active material layer shiny.
[Formation of Positive Electrode Active Material Layer]

The positive electrode active material layer slurry produced in the above-described method is applied to both surfaces of an aluminum foil having a thickness of 15 μm as a positive electrode core with a die coater. The positive electrode core coated with the positive electrode active material layer slurry is dried, to remove the NMP in the slurry. As a result, a positive electrode active material layer is formed. Then, the positive electrode active material layer is compressed by a pair of press rollers, to obtain a positive electrode original plate. The positive electrode original plate is cut to have a predetermined size.

Figure 3A:
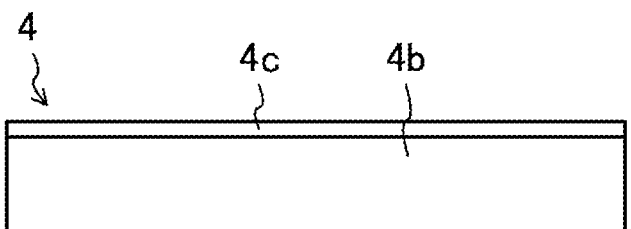
FIG. 3A is a plan view of a positive electrode plate according to the embodiment.

FIG. 3A is a plan view of a positive electrode plate 4. Positive electrode active material layers 4b are respectively formed on both surfaces of a positive electrode core 4a. The positive electrode core exposure part 4c, to which the positive electrode core 4a is exposed, is provided in a longitudinal direction of the positive electrode plate 4 in one end portion in a width direction of the positive electrode plate 4.
[Negative Electrode Plate]

Then, a method of manufacturing a negative electrode plate will be described.
[Production of Negative Electrode Active Material Layer Slurry]

Graphite as a negative electrode active material, styrene-butadiene rubber (SBR) and carboxymethyl cellulose (CMC) as a binder, and water as a dispersion medium are kneaded such that a mass ratio of the graphite, the SBR, and the CMC is 98:1:1, to produce a negative electrode active material layer slurry.
[Formation of Negative Electrode Active Material Layer]

The negative electrode active material layer slurry produced in the above-described method is applied to both surfaces of a copper foil having a thickness of 8 μm as a negative electrode core with a die coater. The negative electrode core coated with the negative electrode active material layer shiny is dried, to remove the water in the slurry. As a result, a negative electrode active material layer is formed. Then, the negative electrode active material layer is compressed by a pair of press rollers, to obtain a negative electrode original plate. The negative electrode original plate is cut to have a predetermined size.

Figure 3B:
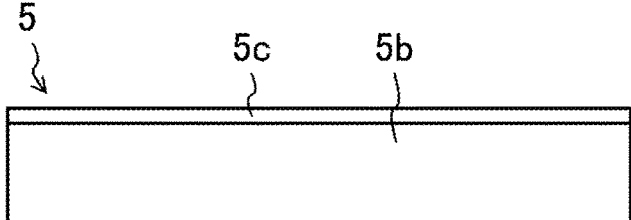
FIG. 3B is a plan view of a negative electrode plate according to the embodiment.

FIG. 3B is a plan view of a negative electrode plate 5. Negative electrode active material layers 5b are respectively formed on both surfaces of a negative electrode core 5a. The negative electrode core exposure part 5c, to which the negative electrode core 5a is exposed, is provided in a longitudinal direction of the negative electrode plate 5 in one end portion in a width direction of the negative electrode plate 5.
[Production of Wound Electrode Assembly]

The positive electrode plate 4 and the negative electrode plate 5 obtained in the above-described method are wound with the separator 20 made of polyethylene, for example, interposed therebetween, and is shaped in a flat shape. As a result, the flat-shaped wound electrode assembly 3 having the wound positive electrode core exposure part 4c at its one end portion and having the wound negative electrode core exposure part 5c at its other end portion is obtained.
[Mounting of Components on Sealing Plate]

A method of mounting the positive electrode current collector 6, the positive electrode terminal 7, the negative electrode current collector 8, and the negative electrode terminal 9 on the sealing plate 2 will be described below.

First, the outer-side insulating member 11 is arranged on the battery outer side of the sealing plate 2, and the inner-side insulating member 10 and the positive electrode current collector 6 are arranged on the battery inner side of the sealing plate 2. Then, the insertion part in the positive electrode terminal 7 is inserted into a through hole provided in each of the outer-side insulating member 11, the sealing plate 2, the inner-side insulating member 10, and the positive electrode current collector 6 from the battery outer side, to caulk the distal end side of the insertion part in the positive electrode terminal 7 onto the positive electrode current collector 6. As a result, the positive electrode terminal 7, the outer-side insulating member 11, the sealing plate 2, the inner-side insulating member 10, and the positive electrode current collector 6 are integrally fixed. A caulked portion at a distal end of the insertion part in the positive electrode terminal 7 is preferably welded to the positive electrode current collector 6.

Similarly, the outer-side insulating member 13 is arranged on the battery outer side of the sealing plate 2, and the inner-side insulating member 12 and the negative electrode current collector 8 are arranged on the battery inner side of the sealing plate 2. Then, the insertion part in the negative electrode terminal 9 is inserted into a through hole provided in each of the outer-side insulating member 13, the sealing plate 2, the inner-side insulating member 12, and the negative electrode current collector 8 from the battery outer side, to caulk the distal end side of the insertion part in the negative electrode terminal 9 onto the negative electrode current collector 8. As a result, the negative electrode terminal 9, the outer-side insulating member 13, the sealing plate 2, the inner-side insulating member 12, and the negative electrode current collector 8 are integrally fixed. A caulked portion at a distal end of the insertion part in the negative electrode terminal 9 is preferably welded to the negative electrode current collector 8.
[Mounting of Current Collector on Wound Electrode Assembly]

Figure 4:
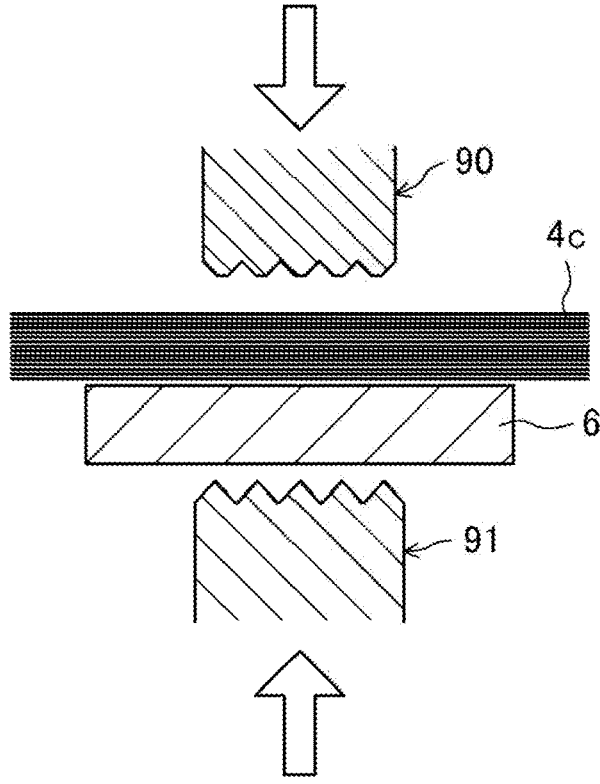
FIG. 4 is a diagram illustrating a method of sandwiching a wound positive electrode core exposure part and a positive electrode current collector with a horn and an anvil when ultrasonic welding is performed in a process for manufacturing the secondary battery according to the embodiment.

The positive electrode current collector 6 is arranged on an outer surface of the positive electrode core exposure part 4c that are laminated by being wound. The laminated positive electrode core exposure part 4c and the positive electrode current collector 6 are sandwiched with a horn 90 and an anvil 91 in an ultrasonic bonding device to perform ultrasonic bonding, as illustrated in FIG. 4. As a result, the wound positive electrode core exposure part 4c and the positive electrode current collector 6 are connected to each other. The negative electrode core exposure part 5c laminated by being wound and the negative electrode current collector 8 can also be connected to each other in a similar method. A connection method is not limited to ultrasonic bonding, but may use resistance welding or laser welding.

[Configuration of Wound Electrode Assembly]

Figure 9:
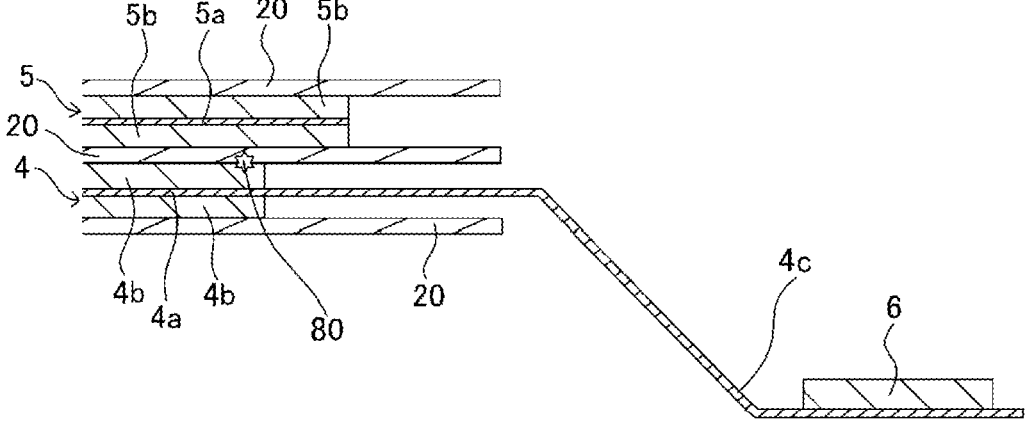
FIG. 9 is a sectional view in the vicinity of the outermost periphery of the wound positive electrode core exposure part in the wound electrode assembly without the tape attached thereto and is a sectional view in the direction along the winding axis of the wound electrode assembly.

FIG. 9 is a sectional view in the vicinity of the outermost surface of the wound positive electrode core exposure part 4*c* in the wound electrode assembly 3. FIG. 9 is a sectional view in a direction along the winding axis of the wound electrode assembly 3. FIG. 9 is a diagram illustrating a state where the tape 30 has not been attached to the wound electrode assembly 3. The separator 20 is arranged on the outermost periphery of the wound electrode assembly 3. In the wound electrode assembly 3, a layer in the negative electrode plate 5 positioned on the outermost periphery side is positioned closer to the outermost periphery of the wound electrode assembly 3 than a layer in the positive electrode plate 4 positioned on the outermost periphery side.

The positive electrode core exposure part 4*c* laminated by being wound is bundled and connected to the positive electrode current collector 6, although partially omitted in FIG. 9. In the secondary battery comprising the wound electrode assembly 3, if an electrolytic solution is injected into the battery case 200, a foreign substance 80, together with the electrolytic solution, enters a space between the positive electrode plate 4 and the separator 20 or between the negative electrode plate 5 and the separator 20, as illustrated in FIG. 9, so that an internal short circuit may occur.

To suppress such an internal short circuit, when a tape is attached to the outermost surface of the positive electrode core exposure part 4*c* from the separator 20 positioned on the outermost periphery of the wound electrode assembly 3, the foreign substance can be prevented from entering the wound electrode assembly 3. However, the electrolytic solution does not easily enter the wound electrode assembly 3. A portion where the electrolytic solution is insufficient occurs in the wound electrode assembly 3 so that charge-discharge reaction may be non-uniform or a lithium metal may be deposited.

[Attachment of Tape]

Figure 5:
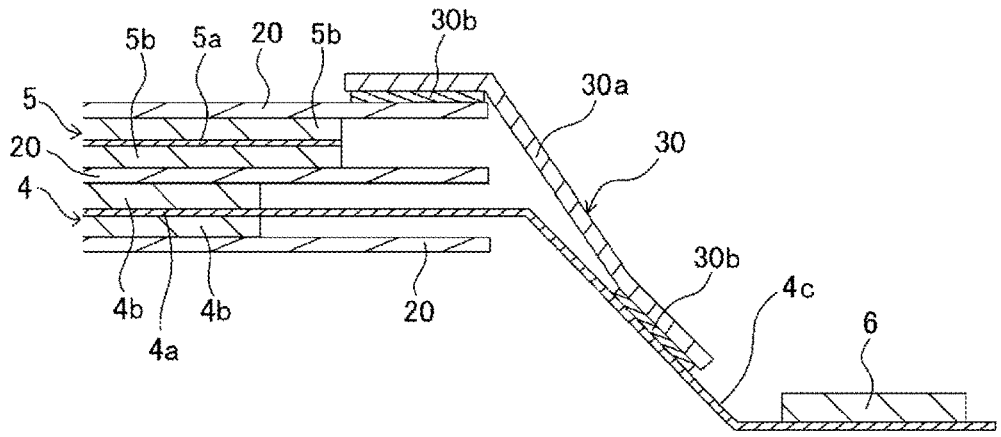
FIG. 5 is a sectional view in the vicinity of an outermost periphery of the wound positive electrode core exposure part in a wound electrode assembly according to the embodiment and is a sectional view in a direction along a winding axis of the wound electrode assembly.

The tape 30 is attached to the outermost surface of the wound positive electrode core exposure part 4*c,* starting from the separator 20 positioned on the outermost surface of the flat-shaped wound electrode assembly 3, as illustrated in FIG. 5. The tape 30 includes a porous base material 30*a* and an adhesive layer 30*b* provided on one surface of the base material 30*a*.

As illustrated in FIG. 6, two adhesive layers 30*b* are provided in a longitudinal direction of the tape 30 on one surface of the base material 30*a*. The two adhesive layers 30*b* are provided away from each other in a width direction of the tape 30.

As illustrated in FIG. 5, the separator 20 is arranged on the outermost peripheral surface of the wound electrode assembly 3. In the wound electrode assembly 3, the layer positioned on the outermost periphery side of the wound electrode assembly 3 in the negative electrode plate 5 is positioned closer to the outermost periphery of the wound electrode assembly 3 than the layer positioned on the outermost periphery side of the wound electrode assembly 3 in the positive electrode plate 4.

The base material 30*a* in the tape 30 is connected to separator 20 positioned on the outermost periphery of the wound electrode assembly 3 by the adhesive layer 30*b*. The base material 30*a* in the tape 30 is connected to the outermost surface of the positive electrode core exposure part 4*c* wound by the adhesive layer 30*b*. The base material 30*a* is provided with a region where the adhesive layer 30*b* is not formed between a portion connected to the separator 20 in the tape 30 and a portion connected to the positive electrode core exposure part 4*c* in the tape 30. The base material 30*a* is a porous member through which an electrolytic solution can penetrate. Such a configuration prevents a foreign substance from entering the wound electrode assembly 3 without preventing the electrolytic solution from entering the wound electrode assembly 3.

A nonwoven fabric is particularly preferable as the porous base material 30*a*. If the base material 30*a* is a nonwoven fabric, a foreign substance can be effectively captured. The nonwoven fabric is preferably composed of fibers made of resin such as polyester, polyolefin, polyamide, polyurethane, or polystyrene, glass fibers, or fibers such as ceramic fibers or cellulose fibers.

The basis weight of the nonwoven fabric is preferably 40 to 100 g/m$^2$. When the basis weight of the nonwoven fabric is set to 40 g/m$^2$ or more, a foreign substance can be more effectively prevented from entering the wound electrode assembly 3. When the basis weight of the nonwoven fabric is set to 100 g/m$^2$ or less, an electrolytic solution can easily enter the wound electrode assembly 3.

The average fiber diameter of the fibers composing the nonwoven fabric is preferably 8 to 60 μm. When the average fiber diameter of the fibers is set to 8 μm or more, a foreign substance can be more effectively prevented from entering the wound electrode assembly 3. When the average fiber diameter of the fibers is set to 60 μm or less, an electrolytic solution can easily enter the wound electrode assembly 3. The average fiber diameter of the fibers is a value obtained by selecting any ten portions on an image by SEM measurement and averaging the respective diameters of the 10 portions.

If a foreign substance having a diameter of 20 μm or more enters the wound electrode assembly 3, an internal short circuit may occur. When the basis weight of the nonwoven fabric is set to 40 g/m$^2$ or more, the foreign substance having a diameter of 20 μm or more can be more effectively prevented from entering the wound electrode assembly 3. When the average fiber diameter of the fibers composing the nonwoven fabric is set to 8 μm or more, the foreign substance having a diameter of 20 μm or more can be more effectively prevented from entering the wound electrode assembly 3.

As the porous base material 30*a,* a porous polymeric film composed of polyolefin resin, fluorine resin, or the like, for example, can be used in addition to the nonwoven fabric.

As the adhesive layer 30*b,* members selected from rubber-based adhesives, acrylic-based adhesives, polyethylene-based adhesives, and the like or their mixtures are preferably used. However, the adhesive layer 30*b* is not limited to these.

As illustrated in FIG. 7A and FIG. 7B, the flat-shaped wound electrode assembly 3 includes a flat portion 3*a* having a substantially uniform thickness and curved portions 3*b* respectively formed at both ends of the flat portion 3*a*. Each of the curved portions 3*b* has a curved outer surface.

The length of the flat portion 3*a* in a direction perpendicular to the winding axis of the wound electrode assembly 3 (a length in a longitudinal direction in FIG. 7A and FIG. 7B) is defined as a length L1. At this time, a length L2 of a region to which the tape 30 is attached in the wound electrode assembly 3 is preferably set to 0.5×L1 or more and more preferably 0.8×L1 or more.

The tape 30 is preferably attached to both outer surfaces of the flat portion 3*a* in the wound electrode assembly 3. In this case, one tape 30 can be attached to one outer surface of the flat portion 3a, and another tape 30 can be attached to the other outer surface of the flat portion 3a. Alternatively, one tape 30 can be attached to span one outer surface of the flat portion 3a, the curved portions 3b, and the other outer surface of the flat portion 3a.

Although an example in which the tape 30 is attached to the wound electrode assembly 3 after the positive electrode current collector 6 is connected to the positive electrode core exposure part 4c has been described above, the positive electrode current collector 6 may be connected to the positive electrode core exposure part 4c after the tape 30 is attached to the wound electrode assembly 3.

As illustrated in FIG. 5, in the direction in which the winding axis of the wound electrode assembly 3 extends, a center-side end portion of the tape 30 is preferably arranged outside an outer-side end portion of the negative electrode plate 5. That is, when the wound electrode assembly 3 is viewed in a direction in which the positive electrode plate 4, the separator 20, and the negative electrode plate 5 are laminated in the flat portion 3a, the negative electrode plate 5 and the tape 30 are preferably arranged not to overlap each other. As a result, when the separator 20 is folded toward the center side (the lower side in FIG. 5) in the lamination direction, a portion having a large thickness can be prevented from partially occurring in the flat portion 3a in the wound electrode assembly 3. The tape 30 may be arranged to overlap the negative electrode plate 5.

The side of one end portion in the width direction of the tape 30 is preferably connected to a region inclined in the positive electrode core exposure part 4c by the adhesive layer 30b.

The width of the base material 30a can be set to approximately 5 mm to 30 mm, for example, but is not limited to this. The width of the adhesive layer 30b can be set to approximately 2 to 10 mm, for example, but is not limited to this. The width of a region, where the adhesive layer 30b is not formed, provided between the two adhesive layers 30b, in the base material 30a can be set to approximately 1 to 25 mm, for example, but is not limited to this.

The tape 30 may be arranged on an outer surface on the side on which the positive electrode current collector 6 is not arranged in the wound positive electrode core exposure part 4c. For example, the tape 30 can be attached before ultrasonic bonding to a portion, which contacts an anvil or a horn for ultrasonic bonding, on the outer surface of the wound positive electrode core exposure part 4c. The tape 30 can be attached after ultrasonic bonding to a portion, which contacts the anvil or the horn for ultrasonic bonding, on the outer surface of the wound positive electrode core exposure part 4c.

Another Embodiment

Figure 8:
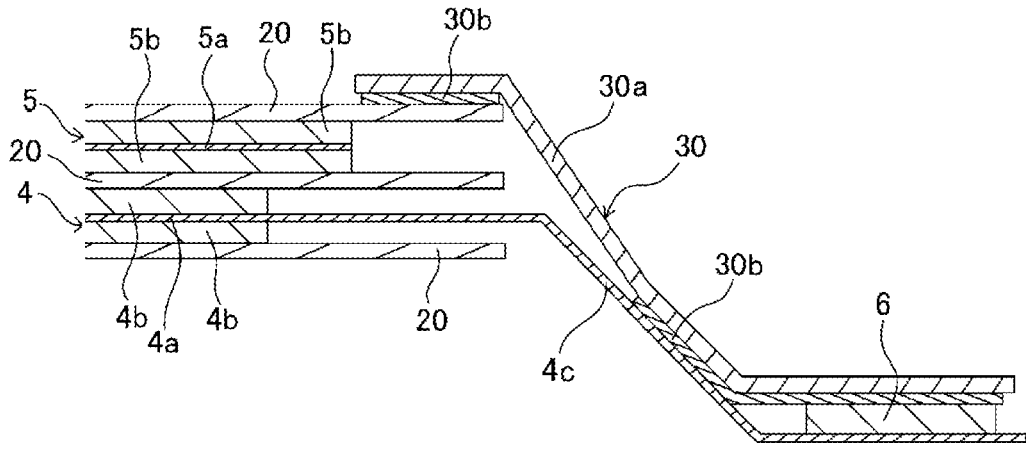
FIG. 8 is a sectional view in the vicinity of the outermost periphery of a wound positive electrode core exposure part in a wound electrode assembly according to another embodiment and is a sectional view in a direction along a winding axis of the wound electrode assembly.

As illustrated in FIG. 8, a part of a tape 30 may be attached onto a positive electrode current collector 6. In such a configuration, a foreign substance that has adhered onto the positive electrode current collector 6 or a burr formed in the positive electrode current collector 6, for example, can be kept on the positive electrode current collector 6 with the tape 30.

After the tape 30 is attached to a separator 20 and a positive electrode core exposure part 4c, the positive electrode current collector 6 may be connected to the positive electrode core exposure part 4c.

<Others>

Known materials can be respectively used for a positive electrode plate, a negative electrode plate, a separator, an electrolyte, and the like.

REFERENCE SIGNS LIST 100 rectangular secondary battery
200 battery case
1 rectangular exterior member
2 sealing plate
3 wound electrode assembly
3a flat portion
3b curved portion
4 positive electrode plate
4a positive electrode core
4b positive electrode active material layer
4c positive electrode core exposure part
5 negative electrode plate
5a negative electrode core
5b negative electrode active material layer
5c negative electrode core exposure part
6 positive electrode current collector
7 positive electrode terminal
7a flange portion
8 negative electrode current collector
9 negative electrode terminal
9a flange portion
10 inner-side insulating member
11 outer-side insulating member
12 inner-side insulating member
13 outer-side insulating member
14 insulation sheet
15 gas exhaust vent
16 electrolytic solution injection hole
17 sealing plug
20 separator
30 tape
30a base material
30b adhesive layer
80 foreign substance
90 horn
91 anvil

The invention claimed is:

1. A secondary battery comprising:
   a first electrode plate in which a first electrode active material layer is formed on a first electrode core;
   a second electrode plate in which a second electrode active material layer is formed on a second electrode core; and
   a flat-shaped wound electrode assembly in which the first electrode plate and the second electrode plate are wound with a separator interposed therebetween, wherein
   the wound electrode assembly includes a wound first electrode core exposure part of the first electrode plate at one end portion in a direction in which a winding axis of the wound electrode assembly extends, and includes a wound second electrode core exposure part of the second electrode plate at the other end portion in the direction in which the winding axis extends,
   the first electrode plate is a positive electrode plate, and the second electrode plate is a negative electrode plate,
   the wound first electrode core exposure part is bundled and connected to a first electrode current collector, the separator is arranged on an outermost surface of the wound electrode assembly, a tape is attached to span the separator arranged on the outermost surface of the wound electrode assembly and an outermost surface of the wound first electrode core exposure part, the tape includes a porous base material and an adhesive layer provided on the base material, the tape includes a region where the adhesive layer is not provided on the base material, between an adhesion part between the tape and the separator arranged on the outermost surface of the wound electrode assembly and an adhesion part between the tape and the outermost surface of the wound first electrode core exposure part, and in the direction in which the winding axis of the wound electrode assembly extends, an arrangement of a center-side end portion of the tape is outside an outer-side end portion of the negative electrode plate.

2. The secondary battery according to claim 1, wherein the porous base material is a nonwoven fabric.

3. The secondary battery according to claim 2, wherein a basis weight of the nonwoven fabric is 40 to 100 g/m², and an average fiber diameter of fibers composing the nonwoven fabric is 8 to 60 μm.

* * * * *